US006988464B1

(12) United States Patent
Rutledge

(10) Patent No.: US 6,988,464 B1
(45) Date of Patent: Jan. 24, 2006

(54) ANIMAL FOOD AND TREAT DISPENSER

(76) Inventor: Jerry Donald Rutledge, 794 Myrtle St., Apt. #1, Atlanta, GA (US) 30308

( * ) Notice: Subject to any disclaimer, the term of this patent is extended or adjusted under 35 U.S.C. 154(b) by 0 days.

(21) Appl. No.: 10/771,555

(22) Filed: Feb. 4, 2004

Related U.S. Application Data
(60) Provisional application No. 60/444,745, filed on Feb. 4, 2003.

(51) Int. Cl.
A01K 1/10 (2006.01)
A01K 39/00 (2006.01)
A01K 5/00 (2006.01)

(52) U.S. Cl. .............. 119/51.01; 119/52.1; 119/61.57; 221/197; 221/287

(58) Field of Classification Search ............... 119/346, 119/51.01, 51.11, 52.1, 53, 900, 53.5, 61.2, 119/61.57, 54, 55; 221/197, 266, 287, 7, 221/8, 155, 242, 312 B
See application file for complete search history.

(56) References Cited

U.S. PATENT DOCUMENTS

| 406,593 | A | * | 7/1889 | O'Kelly ..................... 194/273 |
| 811,396 | A | * | 1/1906 | Heinrich et al. ............ 221/200 |
| 1,746,501 | A | * | 2/1930 | Stamas ....................... 221/135 |
| 2,791,201 | A | * | 5/1957 | Jacob, Sr. .................... 119/55 |
| 3,161,321 | A | * | 12/1964 | Mellion et al. ............. 221/266 |
| 3,568,893 | A | | 3/1971 | Becker |
| 4,376,499 | A | | 3/1983 | Ostergaard |
| 4,770,125 | A | | 9/1988 | Gold et al. |
| 4,823,738 | A | * | 4/1989 | Gold ........................ 119/51.01 |
| 4,889,077 | A | * | 12/1989 | Possis ...................... 119/51.11 |
| 4,984,709 | A | * | 1/1991 | Weinstein ...................... 221/7 |
| 5,078,097 | A | * | 1/1992 | Chisholm ................. 119/51.13 |
| 6,349,671 | B1 | * | 2/2002 | Lewis et al. ............. 119/51.02 |

FOREIGN PATENT DOCUMENTS

DE 3500348 A1 * 1/1985
WO WO 88/07324 10/1988

* cited by examiner

Primary Examiner—Peter M. Poon
Assistant Examiner—Andrea M. Valenti
(74) Attorney, Agent, or Firm—Technoprop Colton LLC

(57) ABSTRACT

A manually operated dog treat dispensing machine capable of dispensing dog treats one at a time. The dispenser consist of a rectangular housing with a hinged housing door and hinged capital that serves as a food supply reservoir which is gravity fed into a spring loaded spindle chamber mounted on an axel and hand crank. Treats exit the dispenser through a chute output consisting of a hinged chute lid, two side walls and a base block. A retaining plate mounted in the end of the chute lid and adjacent to the spindle chamber acts as a stop preventing dispensing of more than one dog treat at a time. The dispenser can also function using a magazine that is inserted inside the rectangular housing area once the rear interior wall is changed out to accommodate the depth of the magazine. Magazine stop tabs at the base of the magazines along with the retaining plate mounted on the chute lid prevent the dispenser from dispensing more than one dog treat at a time. Once the rectangular housing unit is loaded with dog treats and the housing door and capital lid is closed and secured the dispenser is mounted to the wall. Operation of the dispenser is performed by manually turning the hand crank forward toward the operator ¼ turn. With the crank mounted on the spindle axel, the spindle chamber now rotates forward and a dog treat is dispensed through the output chute with the return spring. pulling the spindle chamber back to the upright position and ready for a new treat.

12 Claims, 13 Drawing Sheets

ANIMAL FOOD AND TREAT DISPENSER

CROSS-REFERENCE TO RELATED APPLICATION

Figure 1:
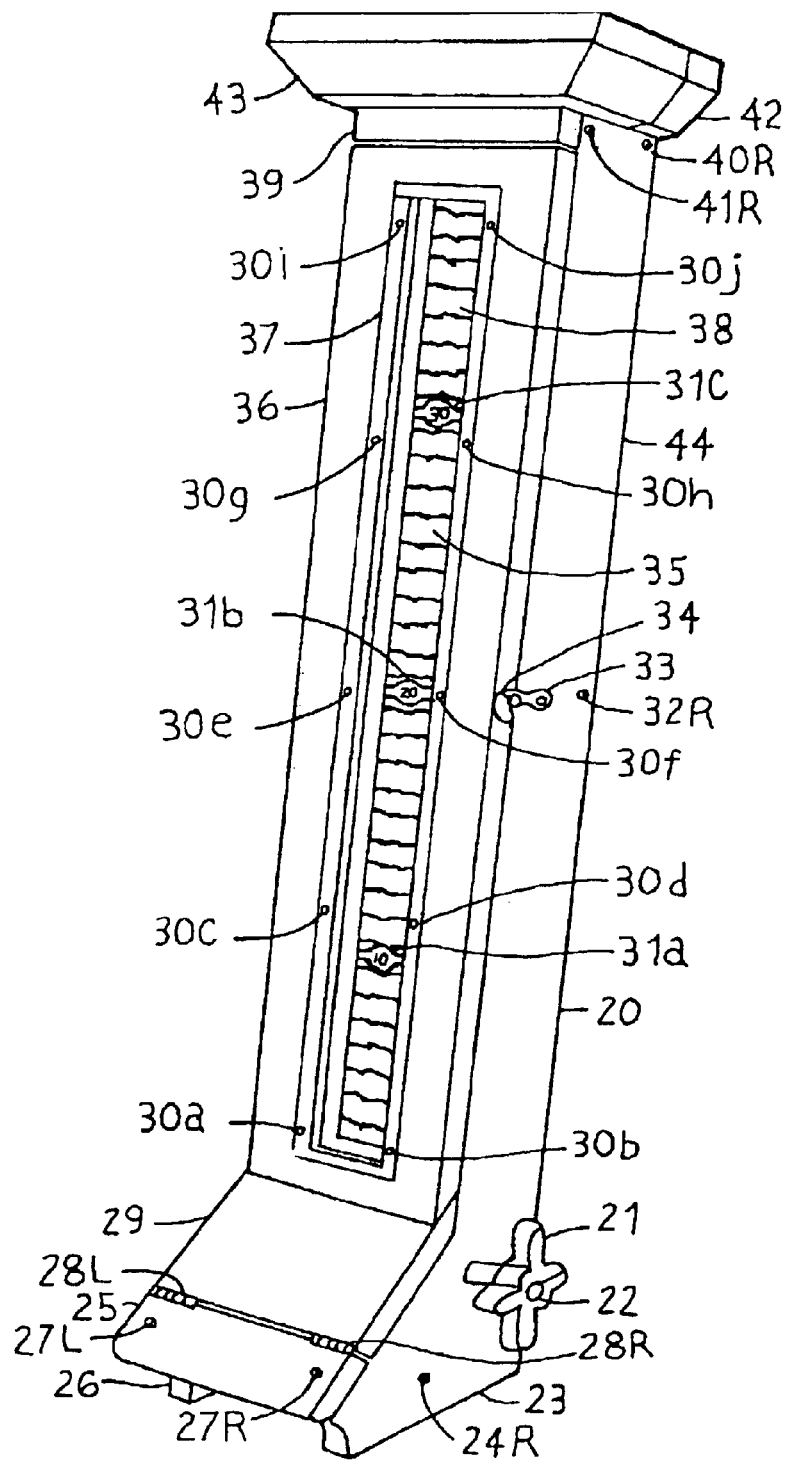

This application is entitled to the benefit of Provisional Patent Application Ser. No. 60/444,745 filed 2003 Feb. 4.

FEDERALLY SPONSORED RESEARCH

Not Applicable

SEQUENCE LISTING OR PROGRAM

Not Applicable

BACKGROUND OF THE INVENTION—FIELD OF INVENTION

This invention relates to animal food and treat dispensers, specifically to such dispensers that can be operated manually with or without a magazine.

BACKGROUND OF THE INVENTION

As a dog owner I've often thought to myself that there had to be a better way of dispensing dog biscuits than from a cardboard box or a cookie jar. With this in mind I set out to invent a device that could hold a large supply of dog biscuits and then dispense them one at a time in a more convenient and easy manner from a centrally located station.

I also sought a solution to the way that the dog biscuits were being packaged and shipped by the manufacturer to the public, one that would be compatible with the dispenser. Instead of just being dumped in a box in a random fashion I invented a magazine that could be pre-loaded with the dog biscuits and sealed in a plastic sleeve by the manufacturer and then shipped out to the public. With the pre-loaded magazines being compatible with the dispenser, this would make loading and operation of the dispenser simple. Although the method of using the pre-loaded magazines with the dispenser is preferred, the dispenser will operate very well with out one. Without a pre-loaded magazine the loading time is longer and is performed manually.

Thereafter, inventors created several types of dispensers for delivering measured quantities of food from a supply receptacle. U.S. Pat. No. 3,568,893 to Becker (1971) discloses a dispenser using a chamber that coacts with a spring to dispense nuts or other items from a pivotal dispensing operation. This dispenser does not operate with a hand crank or axel and the measuring chamber is suited to nuts or other items. It has a simple pull handle one would use to operate the chamber. The housing used to store the food items keeps them in place in a random fashion. U.S. Pat. No. 4,770,125 to Gold et al. (1988) discloses a dispenser capable of being operated by a domestic animal. This dispenser send numerous items through its out put chute when actuated by a domestic animal. This is a difficult and expensive dispenser to manufacture and has limited appeal. With my invention the dispenser is like a piece of art that is very pleasing to the eye and can be displayed just about any where. My dispenser displays the dog treats in a uniformed and attractive manner. The dog treats can be viewed at all times to determine the quantity of treats left in the rectangular housing or in the pre-loaded magazines. Numbers are provided on the glass for determining the quantity left. The dispenser is small in size but holds a large quantity of dog biscuits. International Patent WO 88/07324 to Gold (1988) discloses the same SPRING-BIASED DISPENSER MECHANISM FOR MANUALLY OPERATED ANIMAL FOOD DISPENSING MACHINES as mentioned previously.

BACKGROUND ON INVENTION—OBJECTS AND ADVANTAGES

Accordingly, besides the objects and advantages of the animal food and treat dispenser described in my above patent, several objects and advantages of the present invention are:

(A) To provide a centrally located fixture in which to store and dispense dog biscuits.

(B) To provide a mechanism in which to dispense dog biscuits one at a time while providing the convenience of no storage boxes.

(C) To provide a rectangular housing unit that displays the dog biscuits in a uniform manner and make's obvious to user the quantity in the dispenser.

(D) To provide a user the added convenience of being able to install pre-loaded magazines directly into the rectangular housing thus eliminating time and effort.

(E) To provide a manufacturer of dog biscuits a means in which to store and ship dog biscuits in a uniformed manner while being encased in a magazine that fits easily into the dispenser.

(F) To provide a manufacturer a cost and space saving means of both storing and shipping dog biscuits through use of magazine.

Other objects and advantages are to provide a user with the means to continually have a method in which to store and dispense dog biscuits without the constant hassle of reaching into a box for biscuits, while at the same time providing an attractive apparatus for dispensing dog biscuits. For a manufacturer of dog biscuits the cost savings could be immense. Being able to store and ship biscuits in a compact and uniform magazine would save both space and cost.

SUMMARY

In accordance with the present invention a dog biscuit dispenser comprises an upper rectangular housing for storing biscuits with or without a preloaded magazine. The lower section of the dispenser consists of a spindle chamber for dispensing dog biscuits through an output chute.

DRAWING—FIGURES

FIG. 1 Shows the dispenser from the front and in the upright position.

Figure 2:
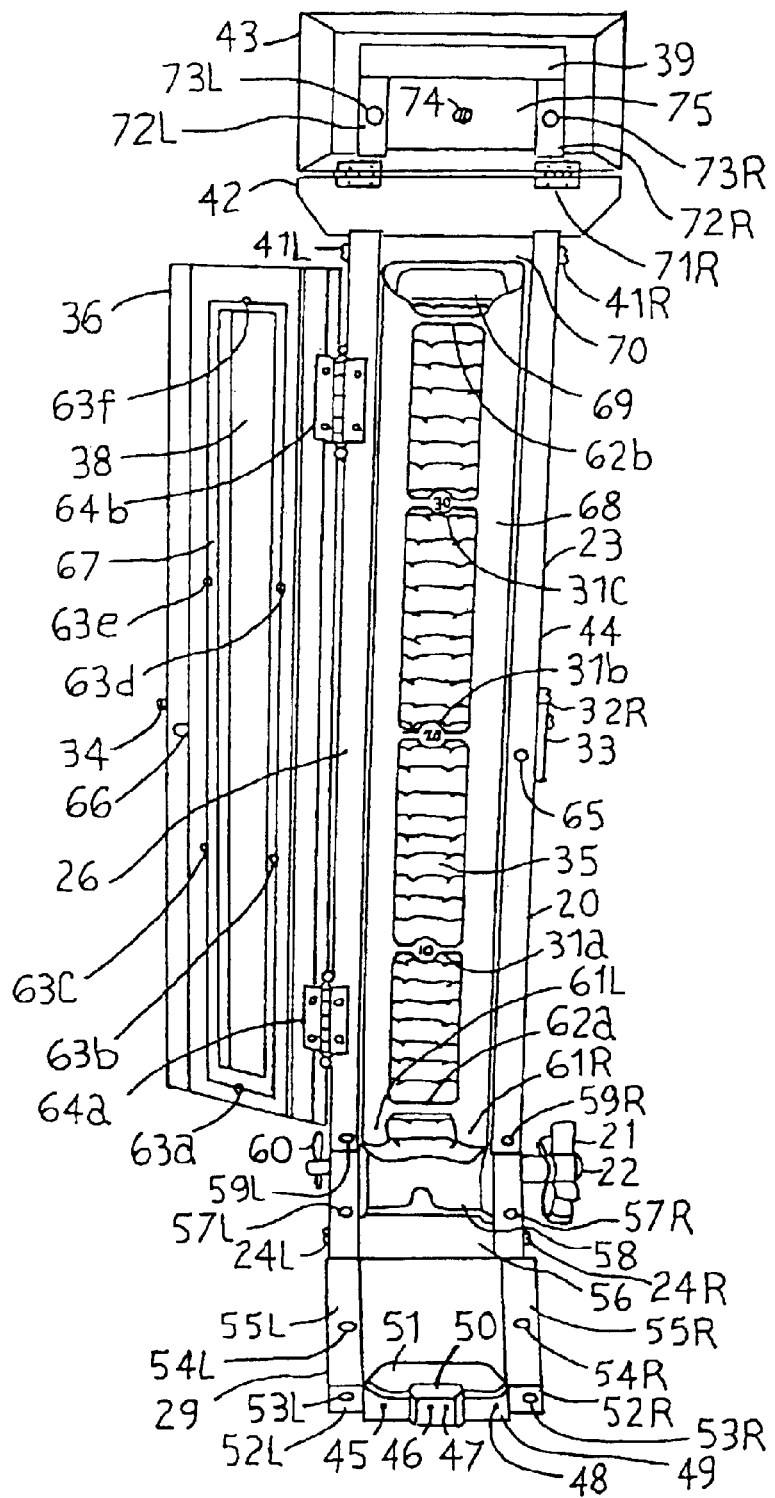
Figure 3:
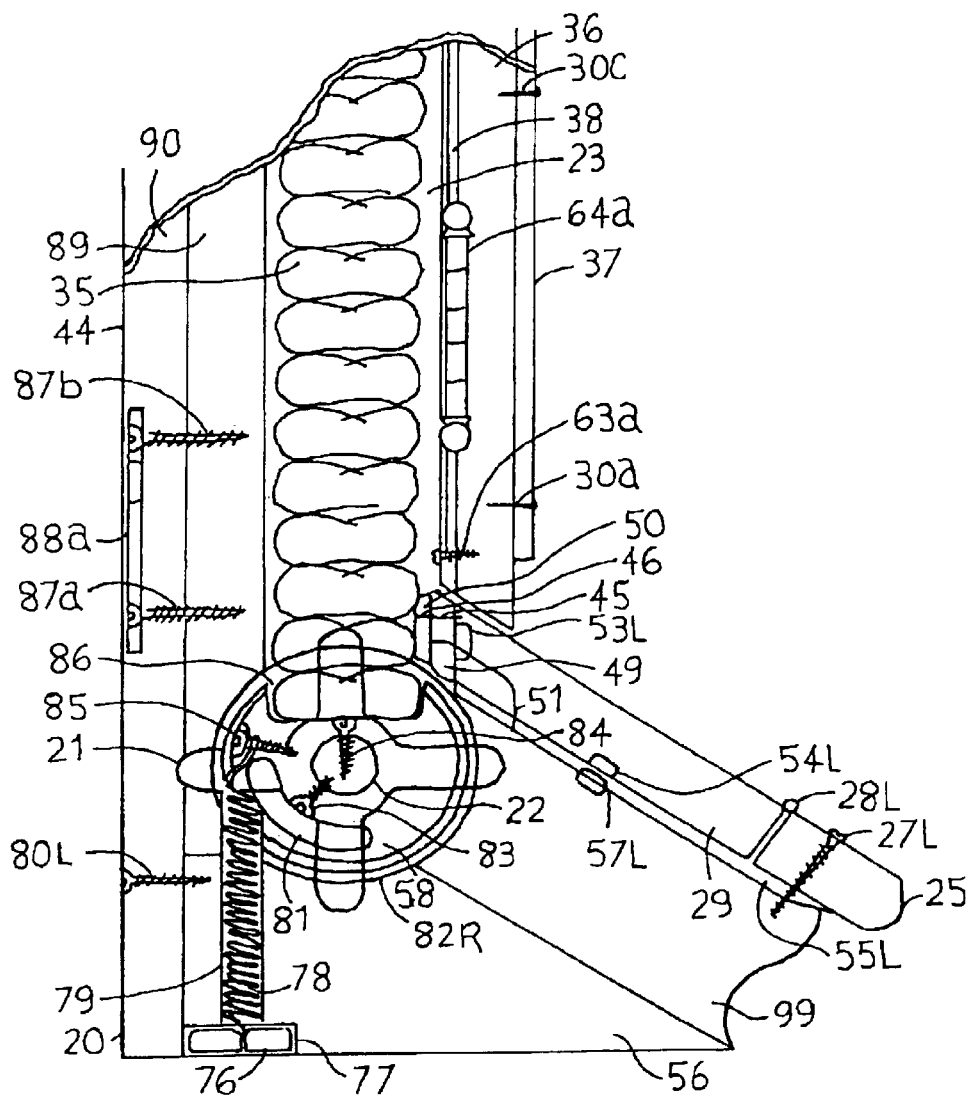
Figure 4:
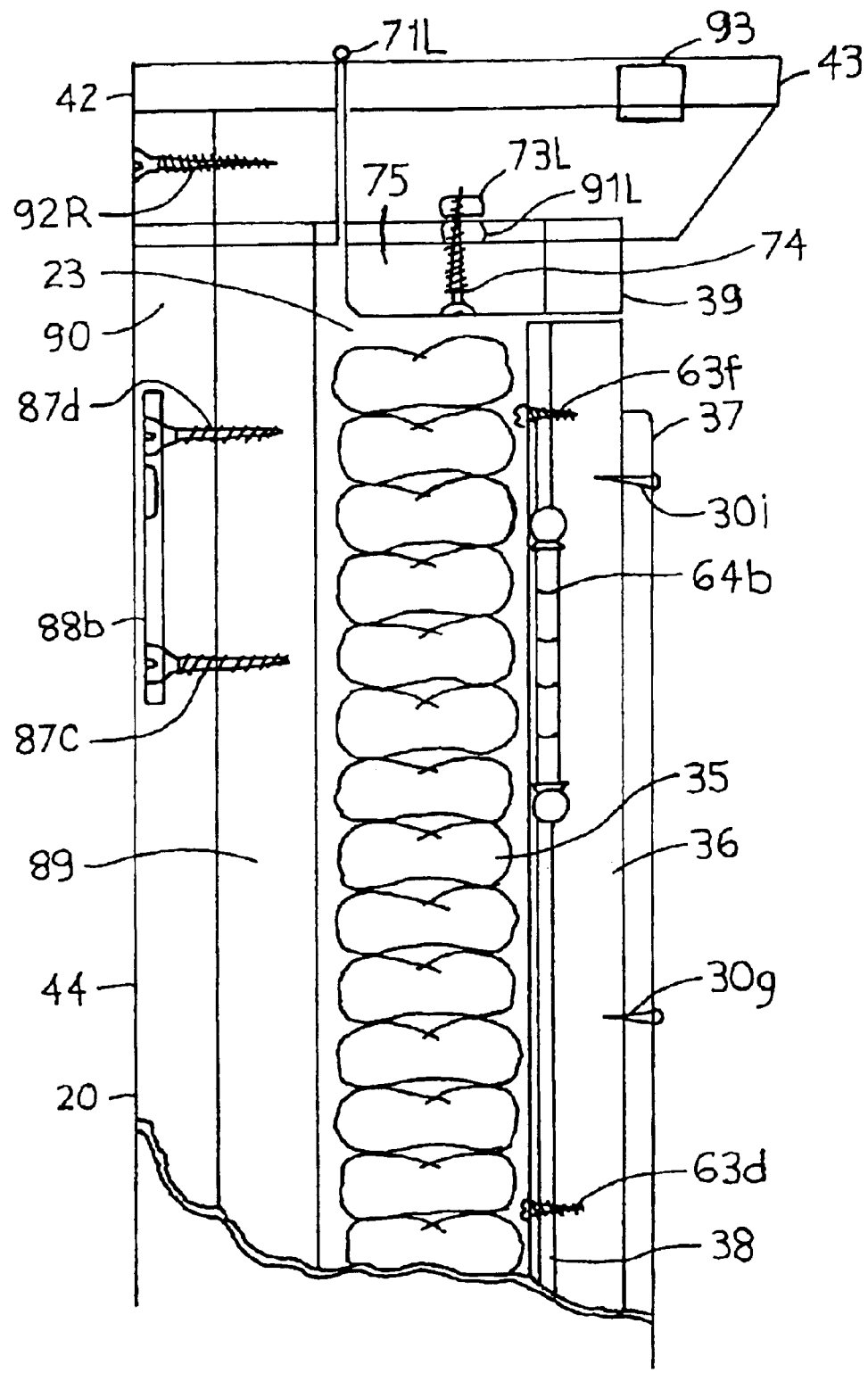
Figure 5:
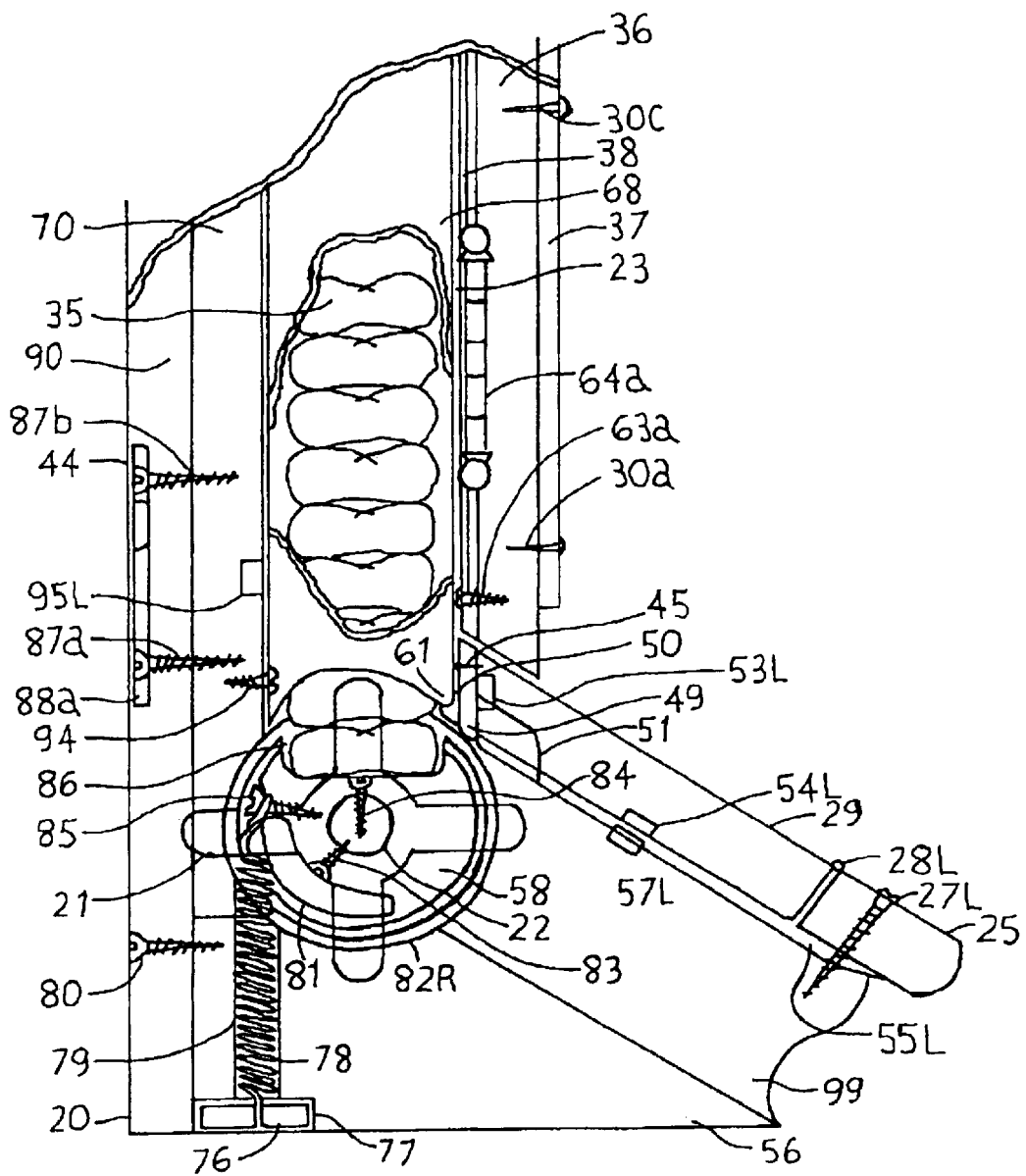
Figure 6:
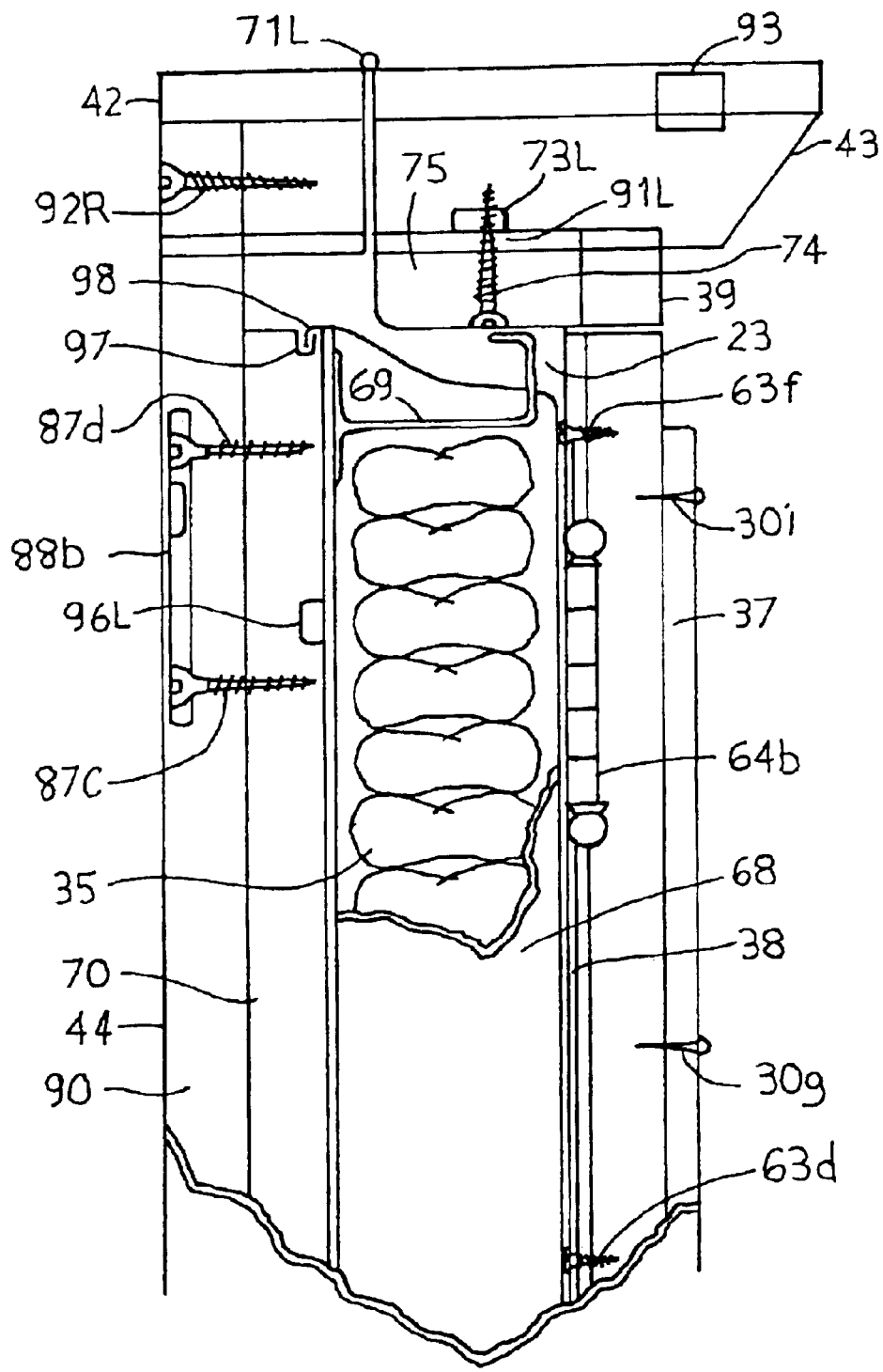
Figure 7:
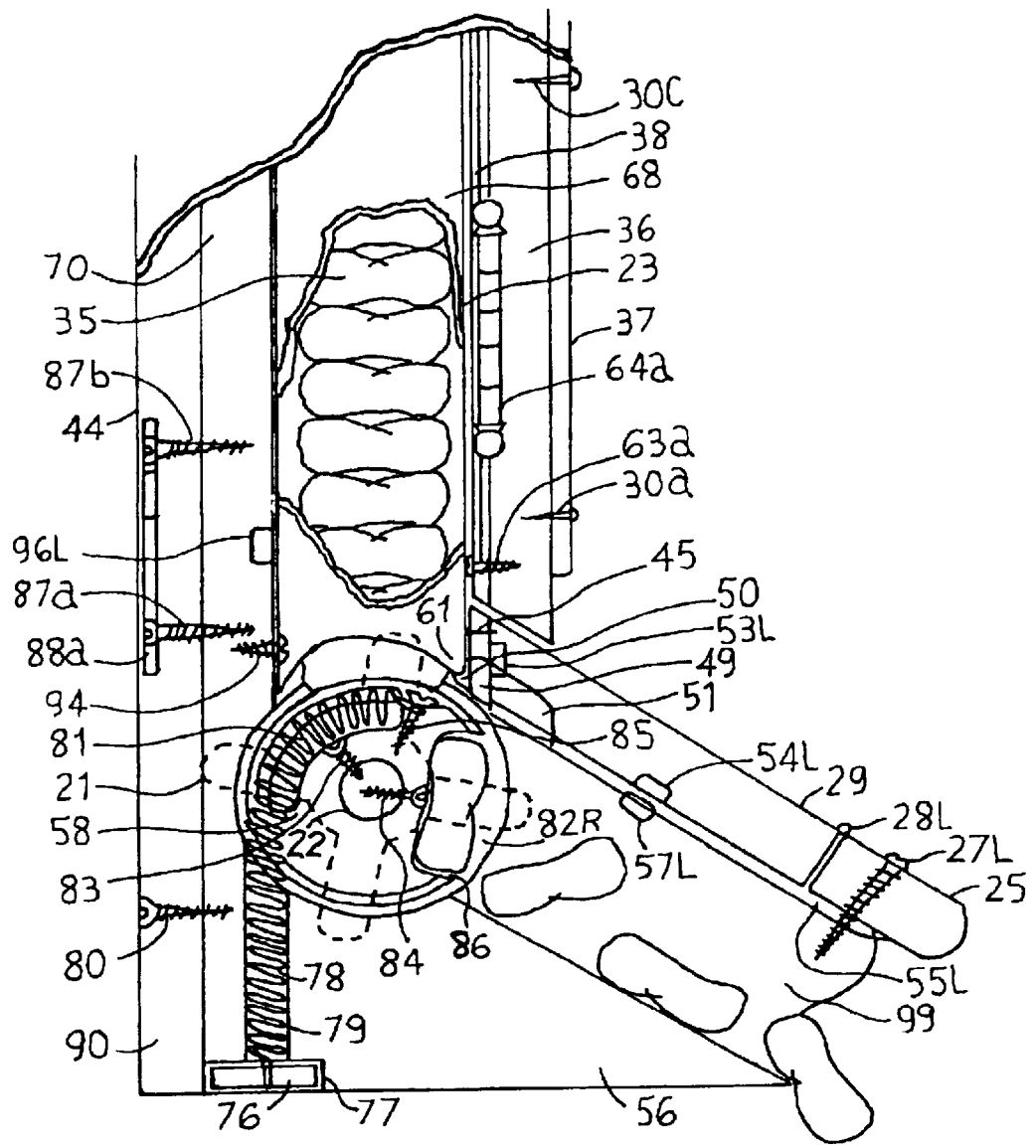
Figure 8:
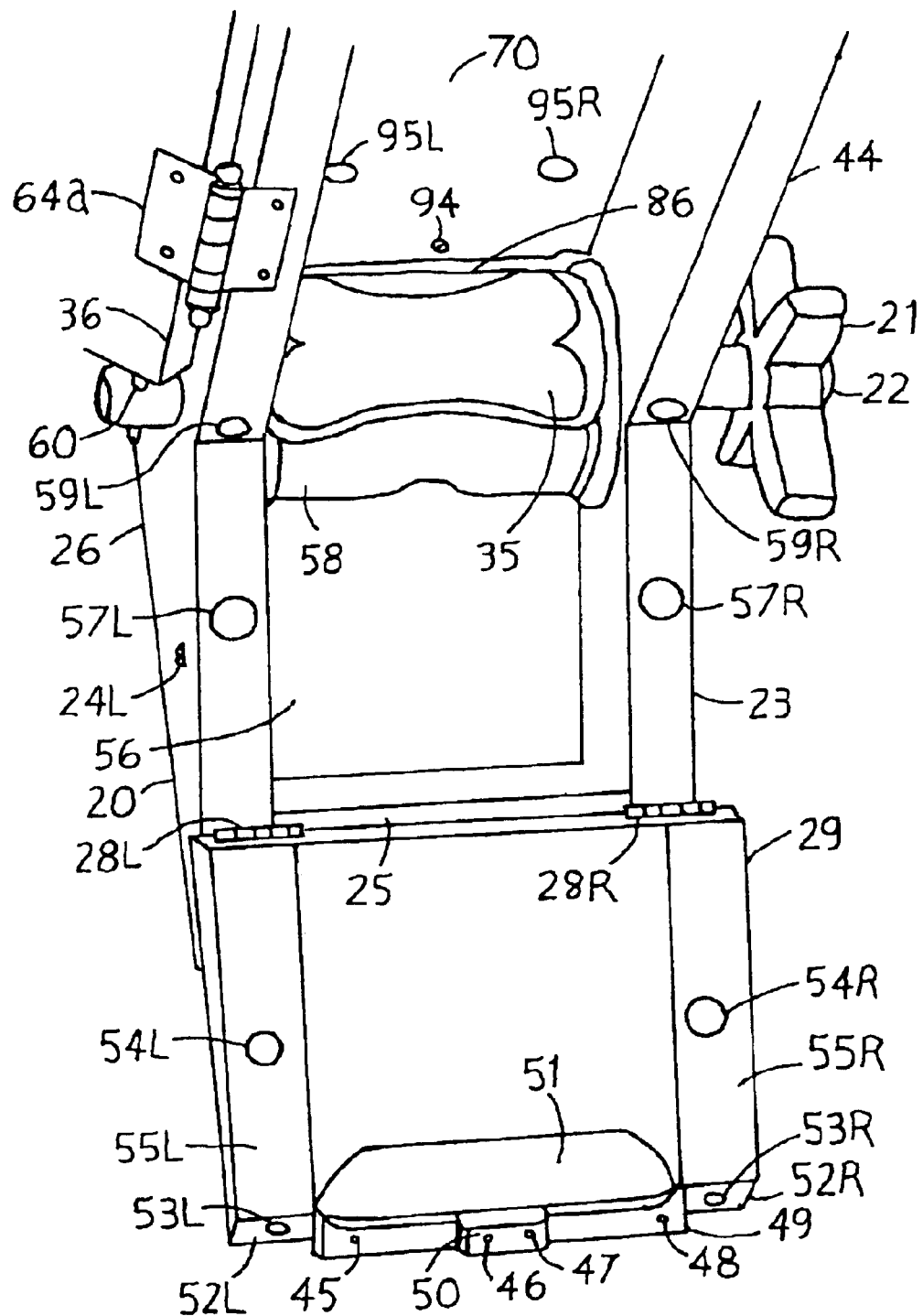
Figure 9:
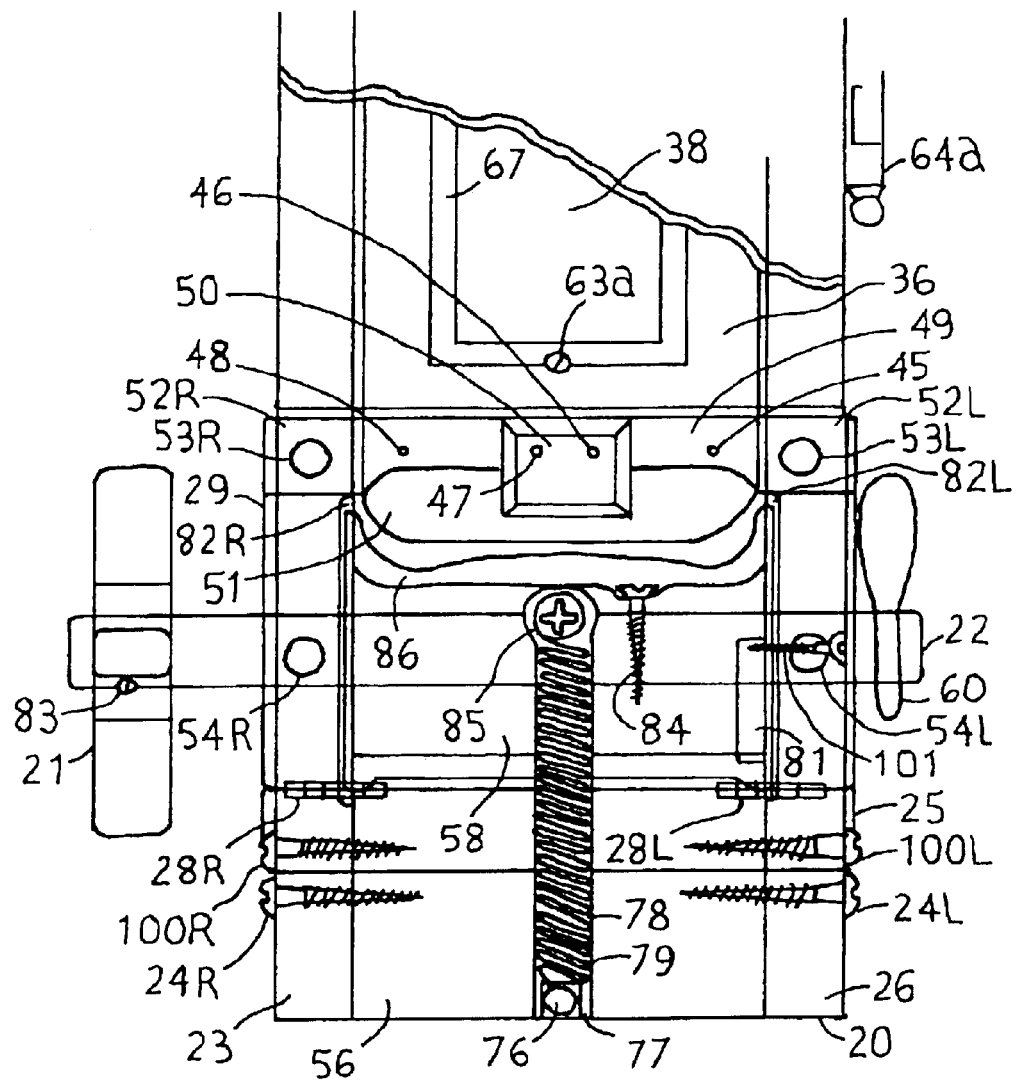
Figure 10:
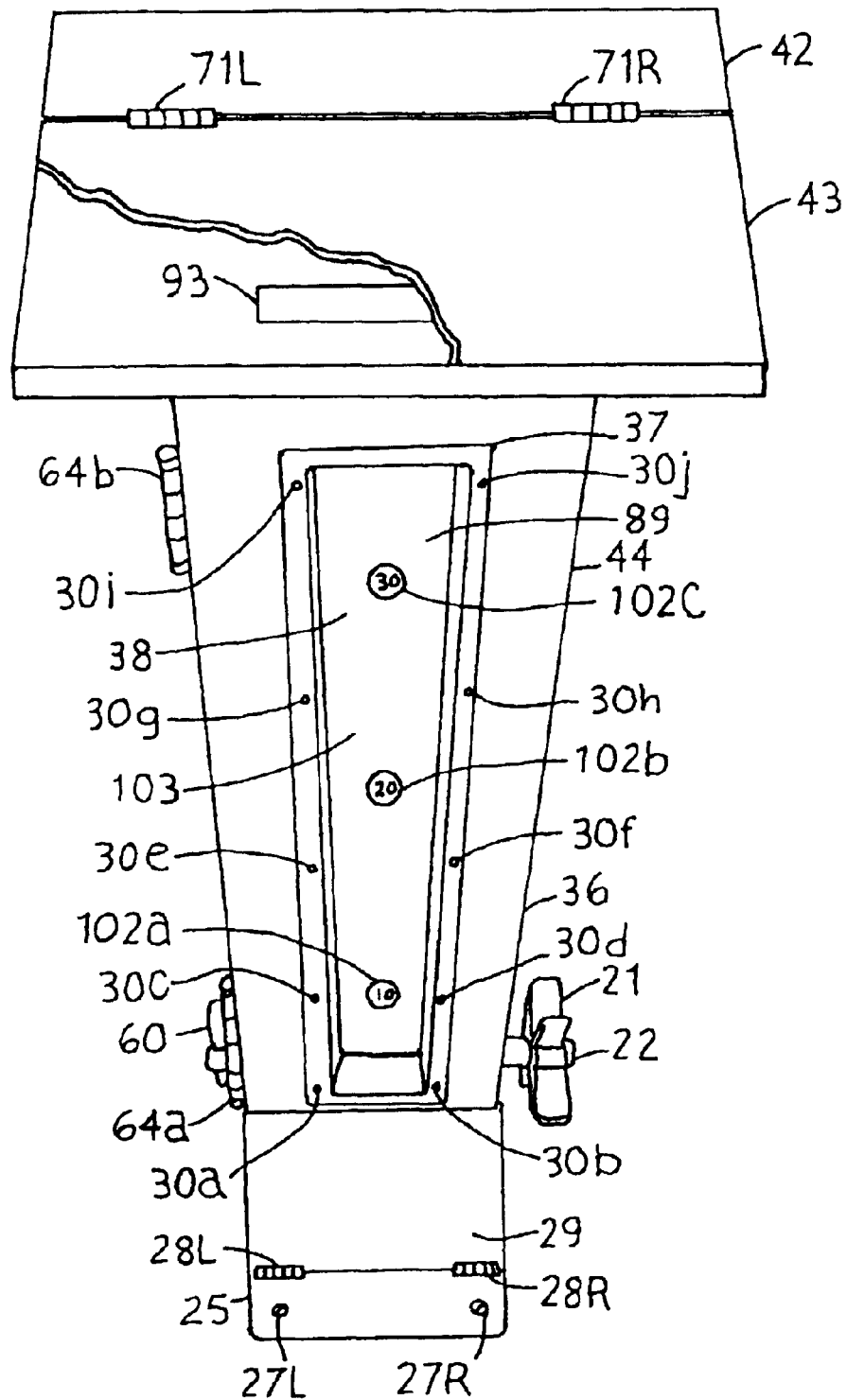
Figure 11:
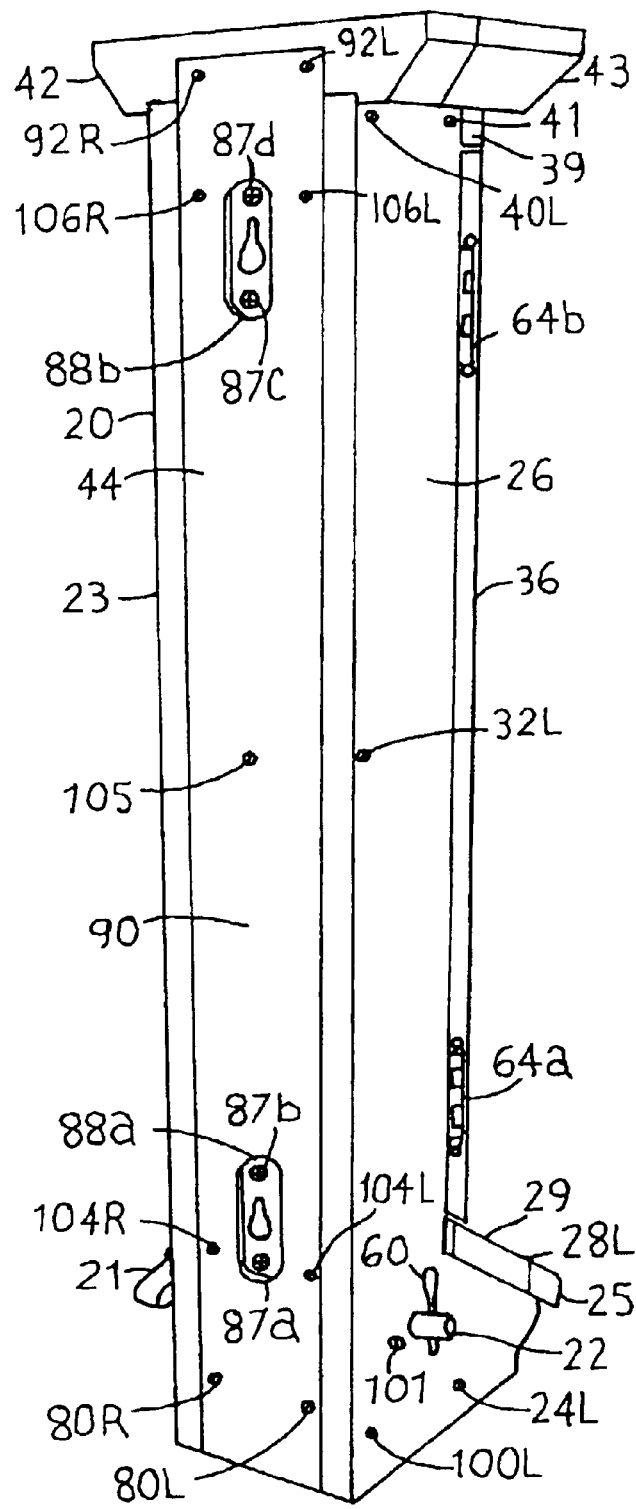
Figure 12:
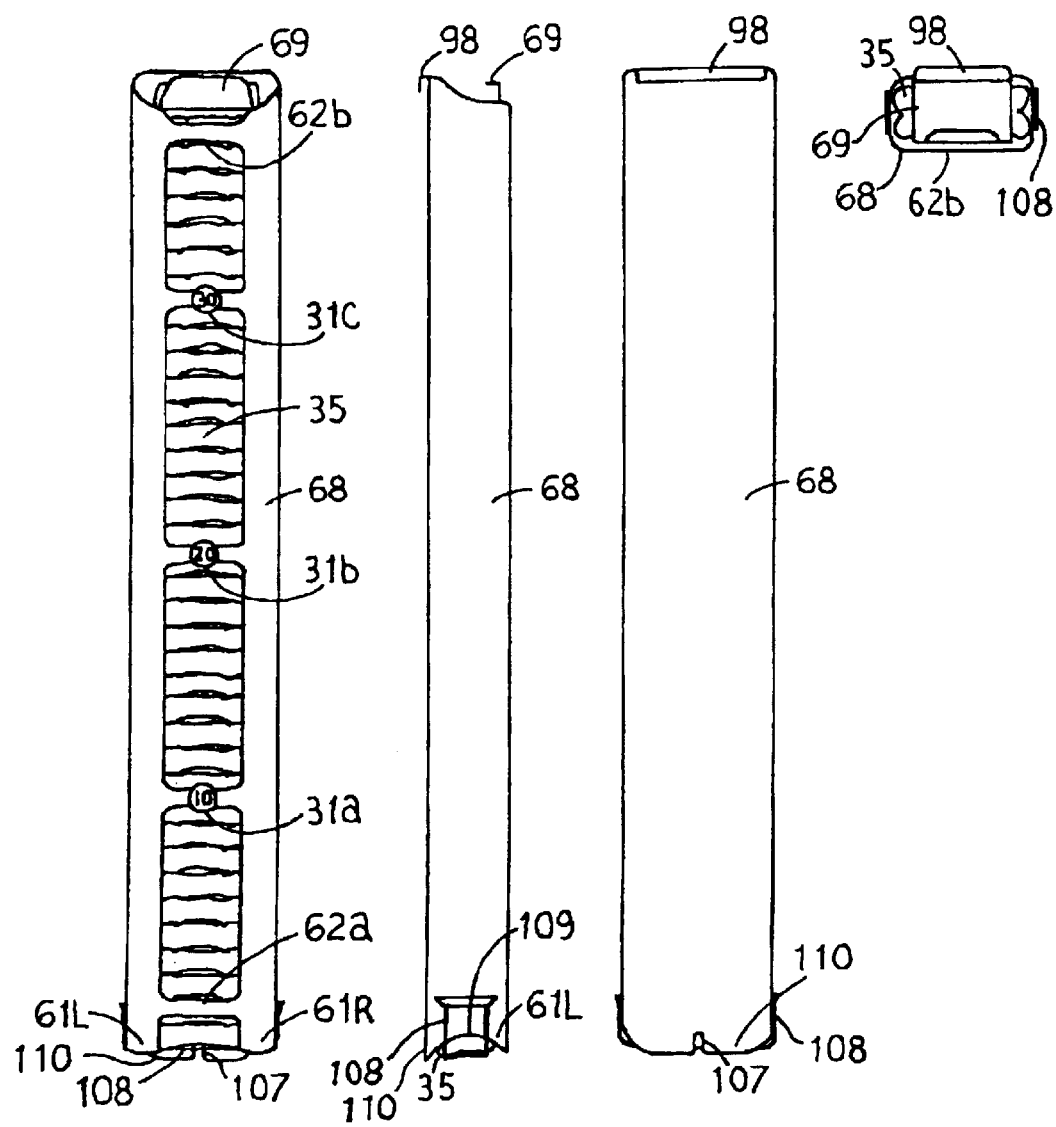
Figure 13:
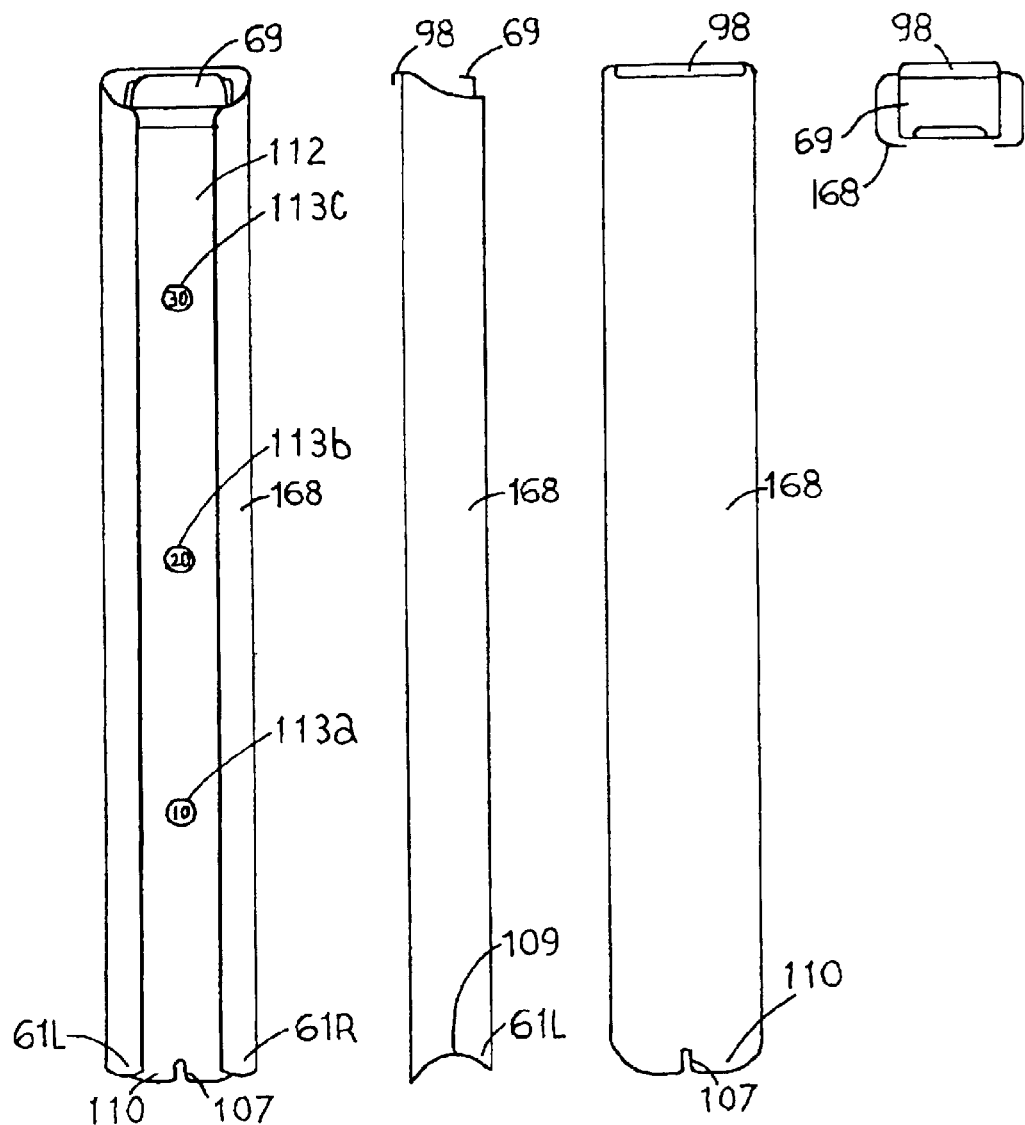

FIG. 2 Shows the dispenser from the front with the compartments open and a magazine FIG. 3 Shows the lower section of the dispenser from the left side without a magazine in use FIG. 4 Shows the upper section of the dispenser from the left side without a magazine in use FIG. 5 Shows the lower section of the dispenser with the magazine from the left side with the magazine in use FIG. 6 Shows the upper section of the dispenser with the magazine in use from the left side FIG. 7 Shows the lower section of the dispenser from the left side with a magazine and in operation FIG. 8 Shows the lower section of the dispenser from the front with a dog bisxuit in the spindle chamber FIG. 9 Shows the lower section of the dispenser from the rear FIG. 10 Shows an overhead view of the dispenser FIG. 11 Shows an upright view of the dispenser from the rear FIG. 12 Shows preloaded magazine from the front, side and back FIG. 13 Shows an empty magazine from the front side and rear

DESCRIPTION

FIG. 1 is a perspective view taken from the user's front and right side of an animal food and treat dispenser 20. Starting from the top, capitals 43, 42 are joined by hinges (not shown) resting atop the door header 39 and is secured to the right wall 23 by threaded fastener 40R and others (not-shown). Threaded fastener 41 is decorative and not necessary. The rectangular housing door 36 is connected to the left wall 26 by hinges (not shown) and consist of glass trim 37 which is decorative and not necessary. The glass trim 37 is attached using fasteners 30*a,b,c,d,e,f,g,h,i,j*.

A treat stack 35 and cross-supports with quantity numbers 31*a,b,c* are visible through the glass 38. A latch stud 34 is mounted in the right side edge of rectangular housing door 36 and a door latch 33 is mounted on the right wall 23. A threaded fastener 32R secures the mid-section of the right wall 23 to the rear wall (not-shown). The chute lid 29 sits under the lower section of door 36 and is joined by two hinges 28L, 28R to the chute cover 25 and is secured by two threaded fasteners 27L, 27R to the left wall 26 and the right wall 23. The spindle hand crank 21 is fitted on the spindle axel 22 and is mounted horizontally through the right face of the right wall 23 and out the left wall 26. All of the parts can be made from wood, plastic or metal. The rectangular housing door 36 can be mounted from either the right or left walls. The crank can also be mounted from either the right or left end of the crank axel 22 along with the axel pin 60.

FIG. 2 is a perspective view of FIG. 1 showing the two piece capital 42, 43 connected by hinges 71L, 71R in the open position. A header block 75 is secured to the capital 43 by use of fastener 74 the header 39 is attached to the front of the header block 75. Two mortise areas 72L, 72R are located to the left and right of the header block 75. Magnets 73L, 73R are located in the mortise areas 72L, 72R and serve as pulls for the capital lid 43.

The rear capital piece 42 is attached to the exterior rear wall (not-shown) by fasteners that are not shown. The rectangular housing door 36 is connected to the left wall 26 by use of two hinges 64*a*, 64*b*. A glass slot 67 is cut into the back side of the rectangular housing door 36 for glass 38 which is secured by using threaded fasteners 63*a,b,c,d,e,f*. The glass 38 could also be secured by points or glue etc. as a substitue for threaded fasteners. The right and left side edges of the door 36 are milled to fit around the front edge of the left 26 and right 23 walls. Magnets 66, 65 serve as pulls for the rectangular housing door 36. The door latch 33, 34 are decorative and not necessary.

The left wall 26 along with the rear interior wall 70 and the right interior wall 23 form a three walled area into which a magazine 68 is inserted. The left wall 26 and the right wall 23 are secured to the rear exterior wall (not-shown) by threaded fasteners 32R and others not shown. Screws 41L, 41R are false fasteners and do not protrude through the right wall 23 or the left wall 26 and they are decorative only and not necessary. The magazine 68 consist of cross supports 62*a*, 62*b* and cross supports with quantity designation numbers 31*a,b,c* . These numbers are for the user to tell the number of treats 35 left but are decorative and not necessary. A handle and treat stop 69 is mounted at the top of the magazine 68 and a treat stack 35 is shown. At the bottom are treat stop tabs 61L, 61R Magnets 59L, 59R, 57L, 57R are mounted into the lower portion of the right wall 23 and left wall 26 and act as pulls for the chute lid 29. The magnets 54L, 54R, 53L, 53R are mounted into the guide edges 55L, 55R and bevel edges 52L, 52R of the chute lid 29 and also act as pulls. All the magnets are mounted flush and set in adhesive. A crank axel 22 is mounted horizontally through holes (not-shown) in the right wall 23, spindle 58 and left wall 26. A hand crank 21 has a center hole (not-shown) and slides over the right end of the crank axel 22 and is held in place by a set screw (not-shown). A rolling pin 60 which is decorative and not necessary is inserted vertically through a hole that is bored in the crank axel 22. The rolling pin 60 is held in place by gravity. The spindle base block 56 is secured to the right wall 23 and left wall 26 by threaded fasteners 24L, 24R and others not shown.

Mounted on the chute lid 29 is a retaining strip 49 and retaining plate 50 that is held into place with glue and fasteners 45, 46, 47, 48. A recess 51 is carved out of the underside of the chute lid 29.

FIG. 3 is a fragmentary view of the lower half of FIG. 1 taken from the user's left side with the left wall removed, and showing use with out a magazine. A treat stack 35 is shown with the base treat 35 sitting in the spindle chamber 86. A spindle rotation groove 81 is cut into the spindle 58. A circular recess 82 is made into the right wall 23 and the left wall 26 (not-shown). The spindle base block 56 contains the return spring 78 and return spring chamber 79 which also extends into the rear interior wall 89 for a short distance. A groove (not-shown) is also cut into the spindle 58 to allow for rotation. At the base of the return spring chamber 79 is the plug chamber 77 containing the return spring plug 76.

The return spring plug 76 has a groove (not-shown) into which the return spring 78 is attached. The rear exterior wall 90 has a mounting bracket 88*a* attached to it with fasteners 88*a*, 88*b* which extend into the rear interior wall 89. Threaded fastener 80 along with others (not-shown) secure the rear exterior wall 90 to the spindle base block 56 as well as to the rear interior wall 89.

When used with out a magazine the rear interior wall 89 is thicker than it would be when using a magazine 68. The rear interior walls are interchangeable depending on the user's preference. Along with the door 36, hand crank 21, rolling pin 60 the spindle rotation groove 81 and the spindle rotation stop screw 101 can be mounted on either end of the spindle.

FIG. 4 is a fragmentary view of the upper half of FIG. 1 taken from the user's left side with the left wall removed and showing use with out a magazine. A treat stack 35 is shown surrounded by a rear interior wall 89, a right side wall 23 and the rectangular housing door 36. The two piece capital 42, 43 is shown attached to the rear exterior wall 90 by threaded fastener 92L. Fastener 92R is not shown. Hinge 71L shows how capital 42 and 43 are connected. Counterweight 93 is recessed into the front section of capital lid 43 serving to offset the weight of the header 39 and header block 75 when the capital. lid 43 is open. Magnets 73L and 91L act as pulls for the capital lid 43. Rear exterior wall 90 is secured to the rear interior wall 89 using threaded fasteners 87*c*, 87*d* and others not shown. Mounting bracket 88*b* is recessed into the backside of the rear exterior wall 90.

FIG. 5 is a fragmentary view of the lower half of FIG. 1 taken from the user's left side with the left side wall removed, and showing use with a loaded magazine 68. A treat stack 35 is shown inside a pre-loaded magazine 68. The bottom treat is sitting in the spindle chamber 86. The loaded magazine 68 is held into position by a hold down screw 94 and a retaining clip 98 (not-shown). Magnets 95L, 95R (not-shown) are also used to hold the magazine 68 into position when made of metal. When the magazines 68 are made of other materials such as plastic the hold down screw 94 and the retaining clip 98 (not-shown) keep the magazine 68 in place.

FIG. 6 is a fragmentary view of the upper half of FIG. 1 taken from the user's left side with the left side wall removed, showing use with a loaded magazine. The magazine has a vertical chute that is a shape molded to conform around a shape of the dog biscuits to keep the dog biscuits in a vertical position. Rear interior wall 70 is cut short of the capital 42 section and a slot 97 is cut in the top end of the rear interior wall 70 that runs parallel to the back of the loaded magazine 68. A retaining clip 98 and slot 97 serve to form a male/female connection. Carry handle/stop 69 also serves as a stop to keep treats 35 from exiting the end of the loaded magazine 68 when inverted or tilted during loading. Magnets 96L and 96R (not-shown) are mounted into the rear interior wall 70. Magnets mounted into the rear interior wall 70 are not necessary when using a metal magazine 68 and are optional.

FIG. 7 is a fragmentary view of the lower half of FIG. 1 taken from the user's left side with the left wall removed. This view also shows use of a loaded magazine 68 and illustrates the delivery of treats 35 through the chute output 99.

This view also illustrates the spindle 58, spindle chamber 86, spindle return spring 78, crank 21 and crank axel 22 all in motion. Treats 35 are viewed exiting the chute output 99.

FIG. 8 is a fragmentary enlarged front view of the lower half of FIG. 1, showing the spindle 58 with a treat 35 in the spindle chamber 86. The remainder of the rectangular housing is empty of treats. Magnets 95L, 95R and the hold down screw 94 are visible on the rear interior wall 70.

FIG. 9 is a fragmentary view taken from the rear of the dispenser showing the lower portion of FIG. 1. The numbers with left and right designation read as if viewing them from the front of the dispenser. The rectangular housing door 36 can be seen overlapping the chute lid 29. A slot 67 accepts the glass 38. The door 36 is shown mounted. Magnets 53R and 53L are mounted into the chute lid 29 bevel areas 52L and 52R. Retaining strip 49 and retaining plate 50 are mounted to the chute lid 29. This view also illustrates how the spindle return spring 78 is mounted in the center of the spindle 58 and the mounting of the spindle mounting screw 84 along with the rotation stop screw 101.

FIG. 10 is a perspective view taken from the user's front showing a overhead and frontal view. Capital 42, 43 are shown with a counterweight 93 mortised into the capital lid 43. Quantity designation numbers 102a,b,c are shown placed on the glass 38 or the rear interior wall 89 and are for use when a magazine is not used. These numbers are not necessary.

FIG. 11 is a perspective view of the dispenser 20 showing the rear and the left side. The numbers with left or right designation read as if viewing them from the front of the dispenser. This view shows the capital section 42 connected to the rear exterior wall 90 by fasteners 92L, 92R. The rear exterior wall 90 is connected to the rear interior wall (not-shown) by threaded fasteners 80L, 80R, 104L, 104R, 87a,b, 105, 87c, 87d. The left wall 26 is connected to the rear exterior wall 90 using threaded fasteners 100L, 32L, 40L

FIG. 12 is a perspective view taken from the front, side, rear and cross-section of a loaded magazine 68. The front view 68a shows a fully loaded magazine 68a with a treat stack 35. The unit has cross-supports 52a,b at the top and bottom along with three other cross-supports 31a,b,c which give the magazine structural strength. Located at the top of the magazine 68a is a carry handle/stop. At the bottom is stop tape 108 along with a slot 107 that fits over the hold down screw 94. Also the treat stop tabs 61L, 61R can be seen. The side view 68b shows the spindle arch cut around 109 along with a profile of the treat stop tabs 61L. The rear view 68c shows the duck tail bottom 110 and the retaining clip 98b. The cross section view 68d shows the magazine 68d as if looking throught the magazine 68d from the top.

FIG. 13 is a perspective view taken from the front, side, rear and cross-section of a unloaded magazine 111a. The figures in FIG. 13 are the same as in FIG. 12 except that the magazine 111a is missing cross sections and the quantity designation numbers 113a,b,c are on the rear interior wall.

Operation

In operation one uses the dispenser 20 and magazine 68 or 111 in a normal manner. The dispenser will operate in two different modes. One is with a magazine 68 or 111 and the other is with-out a magazine 68 or 111. First mode discussed will be with a magazine 68. Since magazines 68 and 111 are similar I will refer to magazine 68 only. When using the dispenser 20 it can be mounted to a wall using the mounting brackets 88a,b located on the rear exterior wall 90, these allow for fast mounting and dismounting. When using a magazine 68 in the dispenser 20 the rear interior wall 70 is required. This wall is thinner that the rear interior wall 89 that is used when operating the dispenser 20 with-out a magazine 68.

The magazine 68 is designed so a manufacturer of animal treats 35 can ship their product already loaded in the magazines 68, and the user removes them from packaging and then loads them into the dispenser 20. If the user decides to use the dispenser 20 with-out a magazine 68, then the user manually loads the dispenser 20 as described later in the operation with-out a magazine section.

When loading a magazine 68, access to the interior of the rectangular housing 44 is gained by lifting the capital lid 43. By lifting, the magnetic pulls 73L, 73R, 91L, and 91R will disengage allowing the user to position the capital lid 43 in the upright position and rest it against the wall. The counterweight 93 keeps the lid from falling.

Next disengage the door latch 33 (decorative and not necessary) and pull the rectangular housing door 36 open. The magnetic pulls 65, 66 will disengage. Next the chute lid 29 is opened by pulling at the top center and toward the user. Magnetic pulls 59L, 59R, 57L, 57R, 54L, 54R, 53L and 53R will disengage and allow the chute lid 29 to rest on the chute cover 25. These pulls keep the chute lid 29 tightly closed since treats 35 can sometimes hit against the retaining strip 49 and retaining plate 50. Now the dispenser 20 interior is exposed. See (FIG. 8) with the spindle 58 and spindle chamber 86 in the upright position along with the return spring 78 contracted the dispenser 20 is now ready to accept a magazine 68.

Operation with a Magazine 68

To load a magazine 68 the user position's the magazine in one hand with the bottom tiled upward. With the other hand removes the stop tape 108. Next place a finger on the bottom treat 35 and return the magazine 68 to the upright position. Now using the carry handle/stop 69 guide the magazine 68 into the interior of the dispenser 20 while lining up the retaining slot 107 over the hold down screw 94. At the same time guide the retaining clip 98 over the retaining slot 97 and push the magazine 68 back and downward while removing your finger. The magazine 68 will settle onto the hold down screw 94 and into the retaining slot 97. The bottom treat 35 will fall into the spindle chamber 86. When using a metal magazine 68 the rear interior wall 70 can have magnetic pulls 95L, 95R, 96L, 96R but are not necessary. When using a plastic or other material for a magazine the hold down screw 94 and the retaining clip 98 along with the rectangular housing door 36 keep the magazine 68 in position. At this point the chute lid 29 car be closed and the magnetic pulls 53L, 53R, 54L, 54R, 57L, 57R, 59L and 59R will engage and secure the chute lid 29. The rectangular housing door 36 can be returned to the closed position and the magnetic pulls 66 and 65 will engage. Next close the door latch 33 with the latch stud 34. Now the capital lid 43 is pulled down to the closed position and the magnetic pulls 73L, 73R, 91L and 91R will engage and secure the lid 43.

The dispenser 20 is now considered closed and loaded, and is now ready for delivery of animal treats 35. When cycling treats 35 through the dispenser 20 the magazine 68 has treat stop tabs 61L and 61R that keep the treats 35 from exiting more than one at a time. The treat tabs 61L and 61R also keep the treats 35 from jamming the magazine 68 and the spindle chamber 86. With the magazine 68 in place delivery of treats 35 is achieved by turning the hand crank 21 forward app. ⅓ turn forward toward the user. The hand crank 21 is connected to the crank axel 22 along with the spindle 58. A spindle return spring 78 is also connected to the spindle 58 and to the spindle base block 56. When the hand crank 22 is turned forward toward the user app. ⅓ turn the spindle 58 rotates inside the circular recesses 82L and 82R along with the spindle chamber 86 and the crank axel 22. This expands the spindle return spring 78 and puts tension on the crank axel 22. While moving forward the spindle 58 has a spindle rotation groove 81 in the left side that is used with a spindle rotation stop screw 101.

The spindle rotation stop screw 101 prevents the spindle 58 from traveling to far forward once the treat 35 is delivered, or to far backward past the upright position. The spindle return spring 78 when contracted brings the spindle 58 and spindle chamber 86 back to the upright position and the next treat 35 falls into the spindle chamber 86 and the cycle can be repeated. Along with the stop tabs 61L and 61R the chute lid 29 has a retaining strip 49 and a retaining plate 50 that keep the treat stack 35 in proper alignment and prevents jamming, and also allows only one treat 35 at a time to be delivered.

In order to unload an empty magazine 68 the dispenser 20 is left mounted to the wall. Open the capital lid 43, rectangular housing door 36 and the chute lid 29 as previously discussed. Grip the magazine 68 by the carry handle/stop 69 and lift up until the hold down screw 94 and the retaining slot 97 are cleared and pull outward toward the user until clearing the dispenser 20.

Operation with-out a Magazine

When using the dispenser 20 without a magazine 68 the rear interior wall 89 is required. In order to change the rear interior wall from a 70 to 89 the procedure is as follows. Remove the dispenser 20 from the wall and start by removing threaded fasteners 92L and 92R and lift off the capital 43, 42. Next disengage the door latch 33 and remove the hinge pins 64a and 64b and remove the rectangular housing door 36. Next remove the threaded fasteners 27L, 27R and lift off the chute cover 25 with the chute lid 29. Pull the rolling pin 60 from the crank axel 22. Now remove the spindle mounting screw 84 and then remove threaded fasteners 40L, 32L, 100L, 24L. Now lift off the left wall 26 with the spindle rotation stop screw 101 left in place. Next let the spindle 58 roll backward until the spring plug 76 falls out of the plug chamber 77 and then slide the hand crank 21 and crank axel 22 out together. Now rotate the spindle 58 forward and out until the spindle return spring 78 clears. Now remove threaded fasteners 80L, 80R, 104L, 104R, 87a,b, 105, 87c,d, 106L, 106R and remove the rear interior wall 70 and replace it with rear interior wall 89. Do not break down rear exterior wall 90 from the right wall 23 and the spindle base block 56.

Once the rear interior wall 89 is inserted and everything reassembled in reverse order the dispenser 20 is now ready for loading. Lay the dispenser 20 in your left hand with the capital 42, 43 elevated app. 45 degrees. Next open the capital lid 43 and let it rest in the open position. Now open the door latch 33, and open the rectangular housing door 36 until it rest on the user's wrist. Now open the chute lid 29 and let it rest on the chute cover 25. Place one treat 35 in the spindle chamber 86. See (FIG. 8) and then start stacking the treats 35 one on top of the other until a desired quantity is reached. Now keeping the dispenser 20 with the capital 42, 43 elevated 45 degrees close the chute lid 29 followed by the door 36 and engage the door latch 33. Next pull the capital lid 43 to it's closed position and bring the dispenser 20 to a upright position. The dispenser 20 is now closed and loaded and ready to remount to the wall for operation.

Three differences in the operation of using the dispenser 20 with-out a magazine 68 as compared to use with one is as follows.

1. When not using a magazine 68 the walls 89,26,23 and the rectangular housing door 36 act as the dispenser's 20 own chute to the spindle chamber.
2. When not using a magazine 68 the thicker rear interior wall 89 takes up the extra space that a magazine 68 would require. This keeps the treat stack 35 lined up vertically so the treats 35 will fall in the spindle chamber correctly.
3. When not using a magazine 68 this means that there are no stop tabs 61L, 61R. This leaves only the retaining strip 49 and the retaining plate 50 to keep the treats 35 from jamming the spindle chamber 86 or exiting the spindle chamber 86 more than one at a time. The recess 51 also allows the treats not to hit the chute lid 29 when exiting the spindle chamber.

I claim:

1. A magazine for the storing and dispensing of dog biscuits, the magazine comprising:
  a) a vertical chute having right and left side walls for storage of the dog biscuits in a uniform and orderly manner and for mating with a spindle chamber of a dispenser for dispensing of the dog biscuits;
  b) said vertical chute having a shape molded to conform around a shape of the dog biscuits to keep the dog biscuits in a vertical position;
  c) a handle mounted at a top end of the magazine for loading of the magazine into the dispenser;
  d) a hook on a lip at the top end of the magazine used in conjunction with a slot opening at a bottom end of the magazine for mounting the magazine in the dispenser;
  e) located at the bottom end of the magazine on the right and left side walls is a curved out section for mating up with side walls of the spindle chamber;
  f) stop tabs on the bottom end of the magazine for preventing more than one of the dog biscuits from being dispensed at a time;
  wherein the magazine is retained within the dispenser such that a dog biscuit falls into the spindle chamber and the spindle chamber is rotated to dispense the dog biscuit.

2. The magazine as claimed in claim 1, further comprising cross supports on a front side for giving the magazine structural strength.

3. The magazine as claimed in claim 2, wherein quantity designation numbers on the cross supports.

4. The magazine as claimed in claim 1, further comprising quantity designation numbers on a rear interior wall.

5. The magazine as claimed in claim 1, further comprising a slot for fitting over a hold down screw on the dispenser.

6. The magazine as claimed in claim 1, wherein the magazine is preloaded with the dog biscuits.

7. The magazine as claimed in claim 6, further comprising a stop tape for preventing the dog biscuits from falling out of the magazine prior to use.

8. A magazine for the storing and dispensing of dog biscuits preloaded into the magazine, the magazine comprising:
   a) a vertical chute having right and left side walls for storage of the dog biscuits in a uniform and orderly manner and for mating with a spindle chamber of a dispenser for dispensing of the dog biscuits;
   b) said vertical chute having a shape molded to conform around a shape of the dog biscuits to keep the dog biscuits in a vertical position;
   c) a handle mounted at a top end of the magazine for loading of the magazine into the dispenser;
   d) a hook on a lip at the top end of the magazine used in conjunction with a slot opening at a bottom end of the magazine for mounting the magazine in the dispenser;
   e) located at the bottom end of the magazine on the right and left side walls is a curved out section for mating up with side walls of the spindle chamber;
   f) stop tabs on the bottom end of the magazine for preventing more than one of the dog biscuits from being dispensed at a time; and
   g) a stop tape for preventing the dog biscuits from falling out of the magazine prior to use;
   wherein the magazine is retained within the dispenser such that a dog biscuit falls into the spindle chamber and the spindle chamber is rotated to dispense the dog biscuit.

9. The magazine as claimed in claim 8, further comprising cross supports on a front side for giving the magazine structural strength.

10. The magazine as claimed in claim 9, wherein quantity designation numbers on the cross supports.

11. The magazine as claimed in claim 8, further comprising quantity designation numbers on a rear interior wall.

12. The magazine as claimed in claim 8, further comprising a slot for fitting over a hold down screw on the dispenser.

\* \* \* \* \*

UNITED STATES PATENT AND TRADEMARK OFFICE
CERTIFICATE OF CORRECTION

| | | |
|---|---|---|
| PATENT NO. | : 6,988,464 B1 | Page 1 of 1 |
| APPLICATION NO. | : 10/771555 | |
| DATED | : January 24, 2006 | |
| INVENTOR(S) | : Rutledge | |

It is certified that error appears in the above-identified patent and that said Letters Patent is hereby corrected as shown below:

In the Description, column 6, line 1, delete 'view 68a shows a fully loaded magazine 68a with a treat' and replace with new line --view shows a fully loaded magazine 68 with a treat';
line 2, replace "52a,b" with --62a,b--;
line 5, replace "68a" with --68--;
line 8, delete "68a";
line 10, delete "68c";
line 11, replace "98b" with --98--;
line 11, delete "68d";
line 12, replace "68d" with --68-- in both instances;
line 12, delete "68d as if looking through the magazine 68d from the top." and replace with new line --68 as if looking through the magazine 68 from the top.--
line 14, replace "111a" with --168--;
line 16, replace "111a" with --168--;
line 20, replace "111" with --168--;
line 21, replace "111" with --168--;
line 22, replace "111" with --168--;
line 23, replace "111" with--168--;
line 29, replace "that" with --then--;

Signed and Sealed this

First Day of August, 2006

JON W. DUDAS
*Director of the United States Patent and Trademark Office*